United States Patent
Wright et al.

(10) Patent No.: US 8,237,825 B2
(45) Date of Patent: Aug. 7, 2012

(54) PIXEL REPLACEMENT USING FIVE NEAREST NEIGHBORS

(75) Inventors: James Corey Wright, Roanoke, VA (US); Paul Fleming, Lima, NY (US)

(73) Assignee: Exelis, Inc., McLean, VA (US)

( * ) Notice: Subject to any disclaimer, the term of this patent is extended or adjusted under 35 U.S.C. 154(b) by 793 days.

(21) Appl. No.: 12/332,767

(22) Filed: Dec. 11, 2008

(65) Prior Publication Data

US 2010/0149386 A1    Jun. 17, 2010

(51) Int. Cl.
*H04N 9/64* (2006.01)

(52) U.S. Cl. ......................................... 348/246

(58) Field of Classification Search .................. 348/246, 348/247
See application file for complete search history.

(56) References Cited

U.S. PATENT DOCUMENTS

| | | | |
|---|---|---|---|
| 5,430,555 A | 7/1995 | Sawada et al. | |
| 6,498,831 B2 | 12/2002 | Gransfor et al. | |
| 6,901,173 B2 | 5/2005 | Alderson et al. | |
| 7,113,210 B2 | 9/2006 | Bloom | |
| 7,283,165 B2 | 10/2007 | Alderson et al. | |
| 7,418,130 B2 | 8/2008 | Keshet et al. | |
| 7,430,333 B2 | 9/2008 | Yu et al. | |
| 7,715,617 B2 * | 5/2010 | Nishio et al. | 382/149 |
| 7,969,488 B2 * | 6/2011 | Jerdev | 348/246 |
| 2004/0150731 A1 | 8/2004 | Hara | |
| 2006/0044425 A1 * | 3/2006 | Yeung et al. | 348/246 |
| 2006/0126127 A1 * | 6/2006 | Stanback et al. | 358/474 |
| 2006/0181621 A1 * | 8/2006 | Wang et al. | 348/246 |
| 2008/0056606 A1 * | 3/2008 | Kilgore | 382/275 |
| 2008/0075354 A1 * | 3/2008 | Kalevo | 382/149 |
| 2008/0278609 A1 * | 11/2008 | Otsuki | 348/247 |
| 2009/0214129 A1 * | 8/2009 | Quan | 382/260 |

FOREIGN PATENT DOCUMENTS

EP    1271933 A2    1/2003

OTHER PUBLICATIONS

Chang, Edward, Kernel-size selection for defect pixel identification and correction, Proceeding of the SPIE: Digital Photography III, vol. 3502, pp. 65020J-1-65020J-10, Jan. 29, 2007.
Shantisaroop Pherai and Jurgen Wentzel, Authorized Officers of WIPO, Search Report and Written Opinion of PCT/US2009/064715, Mar. 3, 2010.

* cited by examiner

*Primary Examiner* — Luong T Nguyen
*Assistant Examiner* — Fayez Bhuiyan
(74) *Attorney, Agent, or Firm* — RatnerPrestia

(57) ABSTRACT

An image processing system is provided for replacing a value of a defective pixel located along a center row of a region in an image. The region includes a center row, a previous row located above the center row and a subsequent row located below the center row. The image processing system includes a buffer for storing values of pixels located in the previous row and the center row. The image processing system also includes a selector for selecting a plurality of pixel values located in the previous row and the center row that are adjacent to the location of the defective pixel, without selecting a pixel value on the subsequent row. The image processing system further includes a calculator for determining a replacement value for the defective pixel from values of the selected pixels located in the previous row and the center row.

12 Claims, 4 Drawing Sheets

2NN

| | | |
|---|---|---|
| | | |
| 1 | D | 2 |
| | | |

| | | |
|---|---|---|
| | 1 | |
| | D | 4 |
| 2 | 3 | |

| 1 | 2 | 3 |
|---|---|---|
| 4 | D | 5 |
| 6 | 7 | 8 |

FIG 1(c)

| Bad Pixel | | |
|---|---|---|
| 1 | 2 | 3 |
| 4 | D | 5 |
| | | |

FIG 2(a)

| Bad Column | | |
|---|---|---|
| 1 | D1 | 3 |
| 4 | D2 | 5 |
| | D3 | |

FIG 2(b)

| Bad Row | | |
|---|---|---|
| 1 | 2 | 3 |
| D1 | D2 | D3 |
| | | |

FIG 2(c)

PIXEL REPLACEMENT USING FIVE NEAREST NEIGHBORS

BACKGROUND OF THE INVENTION

Conventional integrated circuit imaging devices include an array of light detecting elements or pixels which are interconnected to generate a signal representation of an image illuminating the device. Common examples of conventional integrated circuit imaging devices are a charge coupled device (CCD) and a complementary metal oxide semiconductor (CMOS) image sensing device and Focal Plane Arrays (FPA). Such integrated circuits employ a pixel, such as a photodiode or phototransistor, that is capable of conducting current approximately proportional to the intensity of the light illuminating the element and a charge storage element. The collection of the signals from the pixels represents the image of a scene viewed by the array.

Each pixel represents a sample of the scene and hence is a data value in the two-dimension image produced by the imaging system. Defective pixels, commonly referred to as "bad pixels," are caused by an array defect and do not provide the correct light intensity value. Bad pixels appear as image artifacts that can reduce the image quality significantly. In particular, a bad pixel produces an output signal that significantly deviates from the mean output level of adjacent pixels when the exposure level of all pixels is uniform.

The defective pixels are typically distributed in a random manner. In some situations, the defective pixels may be clustered together. A "bad column" of adjacent defective pixels or a "bad row" of adjacent defective pixels, however, may also occur.

SUMMARY OF THE INVENTION

The present invention provides an image processing system for replacing a value of a defective pixel located along a center row of a region in an image. The region includes a center row, a previous row located above the center row and a subsequent row located below the center row. The image processing system includes a buffer for storing values of pixels located in the previous row and the center row. The image processing system also includes a selector for selecting a plurality of pixel values located in the previous row and the center row that are adjacent to the location of the defective pixel, without selecting a pixel value on the subsequent row. The image processing system further includes a calculator for determining a replacement value for the defective pixel from values of the selected pixels located in the previous row and the center row.

The present invention further provides an image processing system for replacing values of a plurality of defective pixels adjacent to each other within a 3 row by 3 column region of an image. The image processing system includes a buffer for storing values of pixels located in a previous row above each respective defective pixel and a current row of each respective defective pixel. The image processing system also includes a selector for selecting a plurality of pixel values located in the previous row and the current row that are adjacent to the location of each respective defective pixel, without selecting a pixel value on a subsequent row below each respective defective pixel. The image processing system further includes a calculator for determining a replacement value for the plurality of defective pixels from values of the selected pixels located in the previous row and the current row.

The present invention further provides a method for replacing a value of a defective pixel located along a center row of a region in an image. The region includes a center row, a previous row located above the center row and a subsequent row located below the center row. The method includes the step of storing values of pixels located in the previous row and the center row. The method also includes the step of selecting a plurality of pixel values located in the previous row and the center row that are adjacent to the location of the defective pixel, without selecting a pixel value on the subsequent row. The method further includes the step of determining a replacement value for the defective pixel from values of the selected pixels located in the previous row and the center row.

BRIEF DESCRIPTION OF THE DRAWINGS

FIGS. 1(a), 1(b) and 1(c) are exemplary illustrations of 3×3 regions of an image including a defective pixel and two, four and eight nearest neighboring pixels, respectively.

FIGS. 2(a), 2(b) and 2(c) are exemplary illustrations of 3×3 regions of an image showing nearest neighboring pixels to a single defective pixel, a column of defective pixels and a row of defective pixels, respectively, used for determining a replacement value according to a five nearest neighbor method.

DETAILED DESCRIPTION OF THE INVENTION

Figure 3:
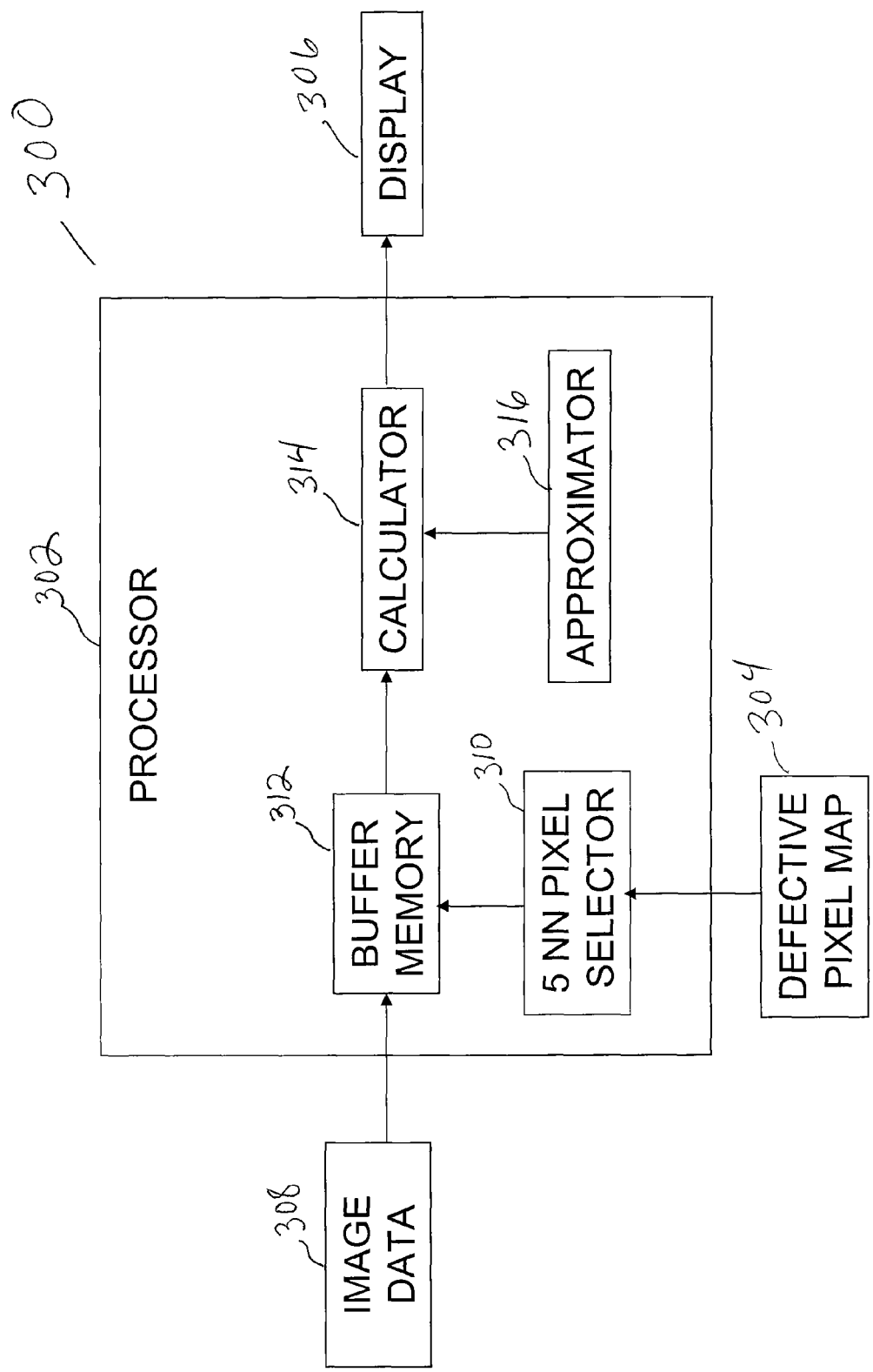
FIG. 3 is a block diagram of an image processing system for determining a replacement value of a defective pixel according to an embodiment of the present invention.

Conventional methods for determining pixel values to replace a defective pixel, a column of defective pixels or a row of defective pixels are known as dead-pixel replacement or dead-cell replacement. In these approaches, a replacement value for a defective pixel is approximated by averaging the values of the pixels bordering or adjacent to (i.e. nearest neighbors) the defective pixel within a 3 row×3 column region (3×3 region) surrounding the defective pixel. That is, the replacement pixel is an average of pixel values in the 3×3 region surrounding the defective pixel.

Multiplication and division using conventional shift registers is simple when multiplying and dividing by powers of two (i.e. two, four, eight, . . . etc.). That is, multiplication and division by powers of two, as opposed to multiplying and dividing by non-powers of two, require less digital logic, resulting in less power consumption. Thus, conventional pixel replacement methods use either two, four or eight nearest neighbors to determine a replacement value for a defective pixel. The 3×3 regions using the two, four or eight nearest neighbors methods are illustrated at FIGS. 1(a), 1(b) and 1(c), respectively. For example, if two neighboring pixels are used to replace the value of the defective pixel, the replacement value is calculated by dividing the sum of the two neighboring pixels by two, requiring a simple bit shift, which is essentially a "free" operation in both resources and power.

The 3×3 regions include a center row, a previous row lying above the center row and a subsequent row lying below the center row. According to the invention, the defective pixel is made to lie in the center of the 3×3 region. The 3×3 regions represent only a portion of an image represented by a larger number of columns and rows of pixels. The values for each pixel in the image are obtained by sequencing through each pixel in a row and proceeding to the next row. Conventional methods, using a neighboring pixel lying on a row that succeeds the defective pixel, require sequencing through and buffering each pixel on the row of the defective pixel and each pixel on the succeeding row until the neighboring pixel is reached. Thus, an entire row of latency is added to the process of obtaining values for the nearest neighboring pixels.

The two nearest neighbor method illustrated in FIG. 1(a) determines a replacement value for defective pixel D, using only the values for pixel 1 and pixel 2. Although the two nearest neighbor method does not use a neighboring pixel along a row succeeding the row of the defective pixel, a replacement value for the defective pixel is determined from only two neighboring pixels, resulting in a replacement value which may not be an accurate value for the defective pixel.

The four and eight nearest neighbor methods illustrated in FIGS. 1(b) and 1(c), respectively, may determine a more accurate replacement value for defective pixel D than the two nearest neighbor method. The four and eight nearest neighbor methods, however, use a neighboring pixel (i.e. pixel 3 in FIG. 1(b) and pixels 6-8 in FIG. 1(c)) along a row succeeding the row of the defective pixel D. That is, the four and eight nearest neighbor methods require buffering of two rows of video (i.e. first row and third row in a progressive read out mode) before the replacement value may be determined, causing an entire row of latency.

The present invention, on the other hand, determines a replacement value for a defective pixel, using five nearest neighboring pixels lying along the row preceding the defective pixel (previous row) and lying along the row of the defective pixel (center row).

A replacement value for a defective pixel is determined by summing the values of the five nearest neighboring pixels and dividing by five. An algorithm for determining the replacement value for the defective pixel according to the five nearest neighbor method is shown below in Equation (1):

$$X = \left(\sum_{n=0}^{4} p_n\right) * \left(\frac{1}{8} + \frac{1}{16} + \frac{1}{64}\right) \quad \text{Equation (1)}$$

where X is the resulting average approximation, p is a pixel value in digital counts and n indexes the five nearest neighbors.

As shown in equation (1), the value of 5 is approximated by adding numerical values which are powers of two (i.e. $\frac{1}{8}$, $\frac{1}{16}$ and $\frac{1}{64}$), resulting in the addition of only two adders instead of a full divider. The approximation to the value of 5 results in an error of +1.5625%, which is comparatively small when balanced against the time (latency) and cost savings (power consumption and hardware) provided by the five nearest neighbor method. For example, for a 12-bit pixel value implemented in a conventional FPGA device, the approximation results in a 90% reduction in FPGA resources and a 95% reduction in power.

FIG. 2(a) shows a 3×3 region for determining a replacement value for a single defective pixel using the five nearest neighbor method. As shown in FIG. 2(a), defective pixel D lies along the center row of the 3×3 region. Values of nearest neighboring pixels 1, 2 and 3 lying along the previous row and values of nearest neighboring pixels 5 and 6 lying along the center row are used to determine a replacement value of defective pixel D. Determining a replacement value for defective pixel D using pixels 1-5 in FIG. 2(a) reduces the latency from an entire row to a single pixel (i.e. pixel 5). Further, the memory required for buffering the pixels succeeding pixel 5 on the current row and the pixels on the subsequent row is reduced by 50% regardless of the image size.

In addition to determining a replacement value for a single defective pixel, the five nearest neighbor method may also determine replacement values for columns of defective pixels and rows of defective pixels. FIG. 2(b) and 2(c) show 3×3 regions for determining a replacement value for columns of defective pixels and rows of defective pixels, respectively.

As shown in FIG. 2(b), a column of defective pixels D1, D2 and D3 lie along the center column of the 3×3 region. A replacement value for defective pixel D1 may be determined according to the exemplary method described above for determining a replacement value for a single defective pixel using the five nearest neighbors. For example, a replacement value for defective pixel D1 may be determined from values of nearest neighboring pixels lying along the previous row (not shown) and values of nearest neighboring pixels 1 and 3. Thus, a replacement value for defective pixel D1 may be determined without using the values for pixels on the subsequent row (center row including pixels 4, D2 and 5), reducing the latency from an entire row to a single neighboring pixel 3.

The replaced value of D1 may be used to determine a replacement value for defective pixel D2. Although it may not be desirable to use the replaced value of a defective pixel to determine the value of another defective pixel, using the replaced value of a defective pixel reduces power consumption and memory. The knowledge that the defective pixel has been replaced must be stored for each clock cycle (1 clock cycle per pixel) until the target defective pixel is reached. Thus, to reduce power consumption and memory, this knowledge may not be stored and the replacement value of the defective pixel may be used.

In the embodiment shown in FIG. 2(b), if the replacement value of defective pixel D1 is not used, the knowledge that defective pixel D1 has been replaced must be stored for each clock cycle until defective pixel D2 is reached on the following row. Thus, after the replacement value is determined for D1, the value of D1 may be used to determine a replacement value for defective pixel D2, eliminating the power consumption and memory required to store the knowledge that defective pixel D1 has been replaced.

Accordingly, a replacement value for defective pixel D2 may be determined by values of nearest neighboring pixels 1, D1 and 3 lying along the previous row and values of nearest neighboring pixels 4 and 5 lying along the center row. That is, the replacement value for defective pixel D2 is determined without using the values for pixels on the subsequent row (row including defective pixel D3), reducing the latency from an entire row to a single neighboring pixel 5. The same five nearest neighbor method may then be used to determine a replacement value for defective pixel D3.

As shown in FIG. 2(c), a row of defective pixels D1, D2 and D3 lie along the center row of the 3×3 region. A replacement value for the row of defective pixels D1, D2 and D3 may be determined according to the exemplary method described above for determining a replacement value for a single defective pixel using the five nearest neighbors. The replacement value for the defective pixels D1, D2 and D3, however, may be determined using values of 3, 4 or 5 nearest neighboring pixels, as shown in Table 2.

A replacement value for defective pixel D1 may be determined from values of 3 or 4 nearest neighboring pixels. For example, the replacement value for defective pixel D1 may be determined from the values of the 3 nearest neighboring pixels lying along the previous row (pixel to the left of pixel 1 (not shown), pixel 1 and pixel 2). Because a replacement value for defective pixel D2 has not yet been determined, defective pixel D2 may not be used to determine the replacement value for defective pixel D1. The value of nearest neighboring pixel to the left of defective pixel D1 (not shown), however, may or may not be used to determine the replacement value for defective pixel D1. If the value of nearest neighboring pixel to the left of defective pixel D1 is used, then 4 nearest neighboring pixels are used to determine a replacement value for defective pixel D1. If the value of nearest neighboring pixel to the left of defective pixel D1 is not used, then 3 nearest neighboring pixels are used to determine a replacement value for defective pixel D1.

As described above with regard to FIG. 2(b), the value of D1 (on the first row) may be used to determine a replacement value for defective pixel D2 (on the center row), eliminating the power consumption and memory required to store the knowledge that defective pixel D1 has been replaced.

In the bad row embodiment shown at FIG. 2(c), however, the pixel value which may be used is immediately to the left of defective pixel D1. If the value of the pixel to the left of defective pixel D1 has not been replaced, the pixel value may be used. If the defective pixel to the left of D1 has been replaced, the knowledge that the defective pixel to the left of D1 has been replaced must only be stored for 1 clock cycle. Thus, the value of nearest neighboring pixel to the left of defective pixel D1 may still be used to determine the replacement value for defective pixel D1. Alternatively, the value of nearest neighboring pixel to the left of defective pixel D1 may not be used to determine the replacement value for defective pixel D1.

A replacement value for defective pixel D2 may also be determined from values of 3 or 4 nearest neighboring pixels. A replacement value for defective pixel D2 may be determined from values of nearest neighboring pixels lying along the previous row (pixels 1, 2 and 3). As described above, the replacement value of defective pixel D1 may or may not be used to determine the replacement value for defective pixel D2. Because a replacement value for defective pixel D3 has not yet been determined, however, defective pixel D3 may not be used to determine the replacement value for defective pixel D2.

If the replaced value of defective pixel D1 is used, then 4 nearest neighboring pixels are used to determine a replacement value for defective pixel D2. If the replaced value of defective pixel D1 is not used, then 3 nearest neighboring pixels are used to determine a replacement value for defective pixel D2.

A replacement value for defective pixel D3 may be determined from 3, 4 or 5 neighboring pixels. For example, the replacement value for defective pixel D3 may be determined from values of the 3 nearest neighboring pixels lying along the previous row (pixel 2, pixel 3 and pixel to the right of pixel 3 (not shown)). As described above, the replacement value of the pixel to the left of the target defective pixel may or may not be used to determine a replacement value for the target defective pixel. That is, the replacement value of defective pixel D2 may or may not be used to determine a replacement value for defective pixel D3.

The value of the nearest neighboring pixel to the right of defective pixel D3 (not shown) may be used if the pixel is not defective. The value of the nearest neighboring pixel to the right of defective pixel D3, however, may not be used if the pixel is defective. Accordingly, if both D2 and the nearest neighboring pixel to the right of defective pixel D3 are used, then 5 nearest neighboring pixels are used to determine a replacement value for defective pixel D3. If only one of D2 and the nearest neighboring pixel to the right of defective pixel D3 are used, then 4 nearest neighboring pixels are used to determine a replacement value for defective pixel D3. If neither D2, nor the nearest neighboring pixel to the right of defective pixel D3 are used, then 3 nearest neighboring pixels are used to determine a replacement value for defective pixel D3.

Tables 1 and 2 show the number of nearest neighboring pixels available for determining replacement values of a single defective pixel (bad pixel), columns of defective pixels (bad column) and rows of defective pixels (bad row) using the two nearest neighbor (2NN) method, the four nearest neighbor (4NN) method, the five nearest neighbor (5NN) method and the eight nearest neighbor (8NN) method. Table 1 shows the number of nearest neighboring pixels available, not including previously corrected pixels. Table 2 shows the number of nearest neighboring pixels available, including previously corrected pixels.

As shown in Table 1, the five nearest neighbor method has more nearest neighboring pixels available than the two and four nearest neighbor methods. Although the eight nearest neighbor method has more nearest neighboring pixels available than the five nearest neighbor method, the eight nearest neighbor method requires using the values of pixels on a row subsequent to a row which includes a target defective pixel to determine a replacement value for the target defective pixel.

By contrast, the five nearest neighbor method determines a replacement value for a target defective pixel by using the largest amount of nearest neighboring pixels that are available without using pixels on a row subsequent to the row which includes the target defective pixel. Thus, the five nearest neighbor method determines a replacement value having a high degree of accuracy while reducing the latency penalty from an entire row to a single pixel.

TABLE 1

|  | 4NN | 5NN | 8NN |
|---|---|---|---|
| Bad Pixel | 4 | 5 | 8 |
| Bad Column | 2 | 4 | 6 |
| Bad Row | 2 | 3-5 | 6 |

TABLE 2

|  | 4NN | 5NN | 8NN |
|---|---|---|---|
| Bad Pixel | 4 | 5 | 8 |
| Bad Column | 3 | 5 | 7 |
| Bad Row | 3 | 3-5 | 7 |

FIG. 3 is a block diagram of an image processing system for determining a replacement value for a defective pixel, columns of defective pixels and rows of defective pixels using the five nearest neighbor method according to an exemplary embodiment of the present invention. As shown in FIG. 3, image processing system 300 includes processor 302, defective pixel map and display 306. Processor 302 receives a location of defective pixels for display 306 from defective pixel map 304. Defective pixel map is typically prepared after display 306 is manufactured in a factory before being shipped from the factory for sale and distribution. An exemplary defective pixel map is shown below at TABLE 2.

As shown in TABLE 3, defective pixels may be determined at locations intersecting at a row (i) and column (j) of display 306. For example, a first defective pixels may be mapped at row 2, column 3 ($P_{2,3}$) and a second defective pixel may be mapped at row 4, column 7 ($P_{4,7}$), as shown in TABLE 2. An exemplary defective pixel map may include any number of defective pixels.

TABLE 3

DEFECTIVE PIXELS $P_{2,3}$
$P_{4,7}$
.
.
.
$P_{i,j}$

Processor 302 also receives image data 308. Image data 308 includes a plurality of rows and columns, each including a plurality of pixels making up an image. Processor 302 processes each pixel of the image in real time. Processor 302 determines a replacement value for each defective pixel provided by defective pixel map 304 and provides the value for each pixel, including the replacement values of each defective pixel, to display 306.

Five nearest neighbor pixel selector 310 receives the location of a defective pixel in display 304, using the defective pixel map shown at TABLE 2 for example, and selects three nearest neighboring pixels lying on the row preceding (previous row) the defective pixel and two nearest neighboring pixels lying along the row (current row) of the defective pixel without selecting a pixel on the row following (subsequent row) the defective pixel.

For example, five nearest neighbor pixel selector 310 may receive the location of a first defective pixel ($P_{2,3}$) from the exemplary defective pixel map at Table 2, indicating the location of the first defective pixel at row 2, column 3 of display 306. Five nearest neighbor pixel selector 310 then selects three nearest neighboring pixels ($P_{1,2}$, $P_{1,3}$, and $P_{1,4}$) lying on the previous row and two nearest neighboring pixels ($P_{2,2}$ and $P_{2,4}$) lying along the current row of the defective pixel without selecting a pixel on the subsequent row (row three).

Five nearest neighbor pixel selector 310 provides the location of the defective pixel and the five nearest neighboring pixels to buffer memory 312. Accordingly, buffer memory 312 sequences through the pixels on the previous row and the current row, storing values of the pixels on the previous row and current row ending with the nearest neighboring pixel ($P_{2,4}$) following the defective pixel ($P_{2,3}$) on the current row.

Thus, according to an exemplary embodiment of the invention, buffer memory 312 stores only the values of pixels on the previous row and the values of pixels up to and including the nearest neighboring pixel ($P_{2,4}$) following the defective pixel, reducing the latency penalty from an entire row (subsequent row) to a single pixel following the defective pixel ($P_{2,3}$).

Calculator 314 determines a replacement value for the defective pixel by dividing the summed values of the five nearest neighboring pixels by five, using equation (1) provided by approximator 316. Display 306 then displays the replacement value for each of the pixels in the image, including the replacement values for each defective pixel.

Figure 4:
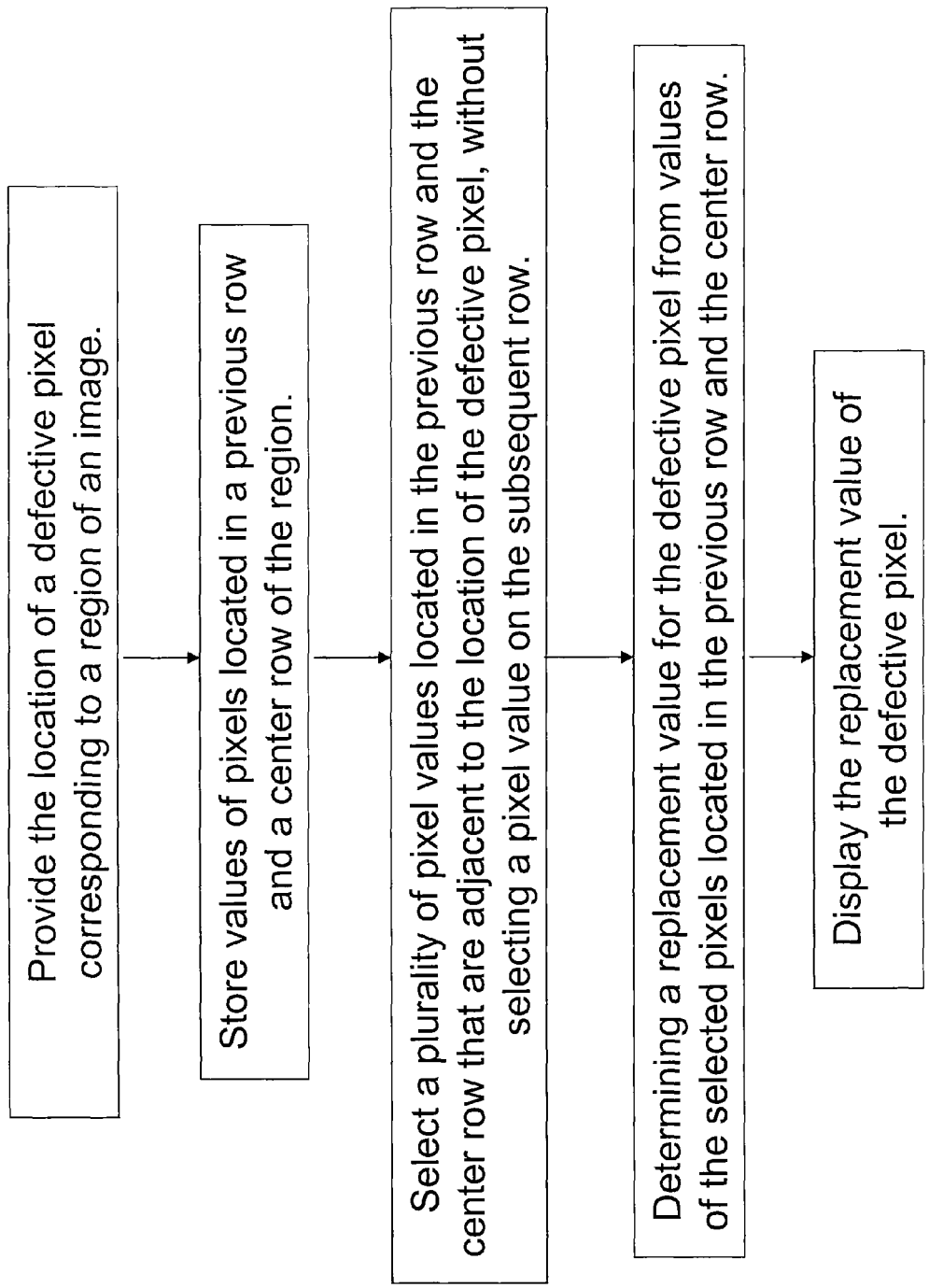
FIG. 4 is a flowchart illustrating a method for determining a replacement value of a defective pixel according to an embodiment of the present invention.

FIG. 4 is a flowchart illustrating a method for determining a replacement value for a defective pixel according to an embodiment of the present invention. As shown at step 400, the location of a defective pixel is provided corresponding to a region of an image. The location of a defective pixel may be provided with a defective pixel map, such as the defective pixel map shown at TABLE 2.

At step 402, values of pixels located in a previous row and a center row of the image are stored. These values may be stored for example, in a buffer, such as buffer memory 312 shown in FIG. 3.

At step 404, a plurality of pixel values located in the previous row and the center row that are adjacent to the location of the defective pixel are selected. Pixel values for pixels located on the subsequent row are not selected, reducing the latency penalty from an entire row to a single pixel. The plurality of pixel values may then be provided to an exemplary buffer.

At step 406, a replacement value for the defective pixel is determined from values of the selected pixels located in the previous row and the center row. The replacement value for the defective pixel is determined from five adjacent pixels including three adjacent pixels located along the previous row and two adjacent pixels located along the center row. For example, a replacement value for the defective pixel D in FIG. 2(a) is determined from three adjacent pixels 1, 2 and 3 located along the previous row and two adjacent pixels 4 and 5 located along the center row.

The replacement value for the defective pixel may then be determined by summing the values of the five adjacent pixels and multiplying the sum by an approximate value of the reciprocal of five. The value of the reciprocal of five may be approximated using fractional powers of two (⅛, 1/16 and ¼) as shown at equation (1). At step 408, the replacement value of the defective pixel is displayed.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An image processing system for replacing a value of a defective pixel located along a center row of a region in an image, the region including a center row, a previous row located above the center row and a subsequent row located below the center row, the image processing system comprising:

a buffer for storing values of pixels located in the previous row and the center row;
a selector for selecting a plurality of pixel values located in the previous row and the center row that are adjacent to the location of the defective pixel, without selecting a pixel value on the subsequent row; and
a calculator for determining a replacement value for the defective pixel from values of the selected pixels located in the previous row and the center row;
wherein the calculator determines the replacement value for the defective pixel from three adjacent pixels located along the previous row and two adjacent pixels located along the center row,
the calculator determines the replacement value for the defective pixel by summing the values of the five adjacent pixels and dividing the sum by an approximate value of five, and
further including an approximator for approximating the value of five using fractional values which are powers of two.

2. An image apparatus according to claim 1, wherein the approximator uses the following equation:

$$X = \left(\sum_{n=0}^{4} p_n\right) * \left(\frac{1}{8} + \frac{1}{16} + \frac{1}{64}\right)$$

where X is the resulting approximation, $p_n$ is a pixel value and n indexes the five adjacent pixels.

3. An image apparatus according to claim 1, further comprising a defective pixel map for providing the location of the defective pixel corresponding to the region.

4. An image apparatus according to claim 1, further comprising a display device for displaying the replacement value of the defective pixel.

5. An image processing system for replacing values of a plurality of defective pixels adjacent to each other within a 3 row by 3 column region of an image, the image processing system comprising:
 a buffer for storing values of pixels located in a previous row above each respective defective pixel and a current row of each respective defective pixel;
 a selector for selecting a plurality of pixel values located in the previous row and the current row that are adjacent to the location of each respective defective pixel, without selecting a pixel value on a subsequent row below each respective defective pixel; and
 a calculator for determining a replacement value for the plurality of defective pixels from values of the selected pixels located in the previous row and the current row;
 wherein the calculator determines the replacement values for the plurality of defective pixels from five respective adjacent pixels including three adjacent pixels located along the previous row and two adjacent pixels located along the current row,
 the calculator determines the replacement values for the plurality of defective pixels by summing the values of the five respective adjacent pixels and dividing the sum by an approximate value of five, and
 further including an approximator for approximating the value of five using fractional values which are powers of two.

6. An image apparatus according to claim 5, wherein the approximator uses the following equation:

$$X = \left(\sum_{n=0}^{4} p_n\right) * \left(\frac{1}{8} + \frac{1}{16} + \frac{1}{64}\right)$$

where X is the resulting approximation, $p_n$ is a pixel value and n indexes the five respective adjacent pixels.

7. An image apparatus according to claim 5, wherein the plurality of defective pixels are located in row of the 3 row by 3 column region.

8. An image apparatus according to claim 7, wherein the plurality of defective pixels are located in a column of the 3 row by 3 column region.

9. A method for replacing a value of a defective pixel located along a center row of a region in an image, the region including a center row, a previous row located above the center row and a subsequent row located below the center row, the method comprising the steps of:
 storing values of pixels located in the previous row and the center row;
 selecting a plurality of pixel values located in the previous row and the center row that are adjacent to the location of the defective pixel, without selecting a pixel value on the subsequent row; and
 determining a replacement value for the defective pixel from values of the selected pixels located in the previous row;
 wherein the replacement value for the defective pixel is determined from three adjacent pixels located along the previous row and two adjacent pixels located along the center row,
 the replacement value for the defective pixel is determined by summing the values of the five adjacent pixels and dividing the sum by an approximate value of five, and
 the approximate value of five is approximated using fractional values which are powers of two.

10. An image apparatus according to claim 9, wherein the replacement value is determined using the following equation:

$$X = \left(\sum_{n=0}^{4} p_n\right) * \left(\frac{1}{8} + \frac{1}{16} + \frac{1}{64}\right)$$

where X is the resulting approximation, $p_n$ is a pixel value and n indexes the five adjacent pixels.

11. An image apparatus according to claim 9, further comprising the step of providing the location of the defective pixel corresponding to the region with a defective pixel map.

12. An image apparatus according to claim 9, further comprising the step of displaying the replacement value of the defective pixel.

* * * * *